(12) United States Patent
Stratton

(10) Patent No.: US 6,877,635 B2
(45) Date of Patent: Apr. 12, 2005

(54) BEVERAGE DISPENSING APPARATUS INCLUDING A WHIPPER INSERT AND METHOD

(76) Inventor: Gus J. Stratton, 5621 Skyline Dr., LaVerne, CA (US) 91750

( * ) Notice: Subject to any disclaimer, the term of this patent is extended or adjusted under 35 U.S.C. 154(b) by 96 days.

(21) Appl. No.: 10/336,063

(22) Filed: Jan. 3, 2003

(65) Prior Publication Data

US 2004/0129724 A1 Jul. 8, 2004

(51) Int. Cl.$^7$ ................................................ B67D 5/56
(52) U.S. Cl. ..................... 222/1; 222/129.1; 222/145.6; 222/459
(58) Field of Search .................... 222/129.1, 145.5, 222/145.6, 459, 1

(56) References Cited

U.S. PATENT DOCUMENTS

| 4,676,401 A | 6/1987 | Fox et al. | |
|---|---|---|---|
| 4,753,370 A | * 6/1988 | Rudick | 222/105 |
| 5,203,474 A | * 4/1993 | Haynes | 222/129.1 |
| 5,381,926 A | 1/1995 | Credle, Jr. et al. | |
| 5,549,222 A | * 8/1996 | Schroeder | 222/129.1 |
| 5,575,405 A | 11/1996 | Stratton et al. | |
| 5,588,557 A | 12/1996 | Topar | |
| 5,607,083 A | * 3/1997 | Vogel et al. | 222/129.1 |
| 6,059,145 A | 5/2000 | Stratton et al. | |
| 6,253,963 B1 | * 7/2001 | Tachibana | 222/129.1 |
| 6,305,269 B1 | 10/2001 | Stratton | |
| 6,401,974 B1 | 6/2002 | Elkind | |
| 6,450,369 B1 | 9/2002 | Heyes | |
| 2002/0130140 A1 | 9/2002 | Cote | |

* cited by examiner

*Primary Examiner*—Joseph A. Kaufman
(74) *Attorney, Agent, or Firm*—Brooks Kushman P.C.

(57) ABSTRACT

An apparatus and method for producing and dispensing whipped soft drinks, hot chocolate and beverages which does not use mechanical whipping such as rotating blades, but rather accomplishes the whipping of the mixture of syrup and water by a whipper insert 28 that is mounted above the dispensing nozzle 24b of the apparatus.

16 Claims, 4 Drawing Sheets

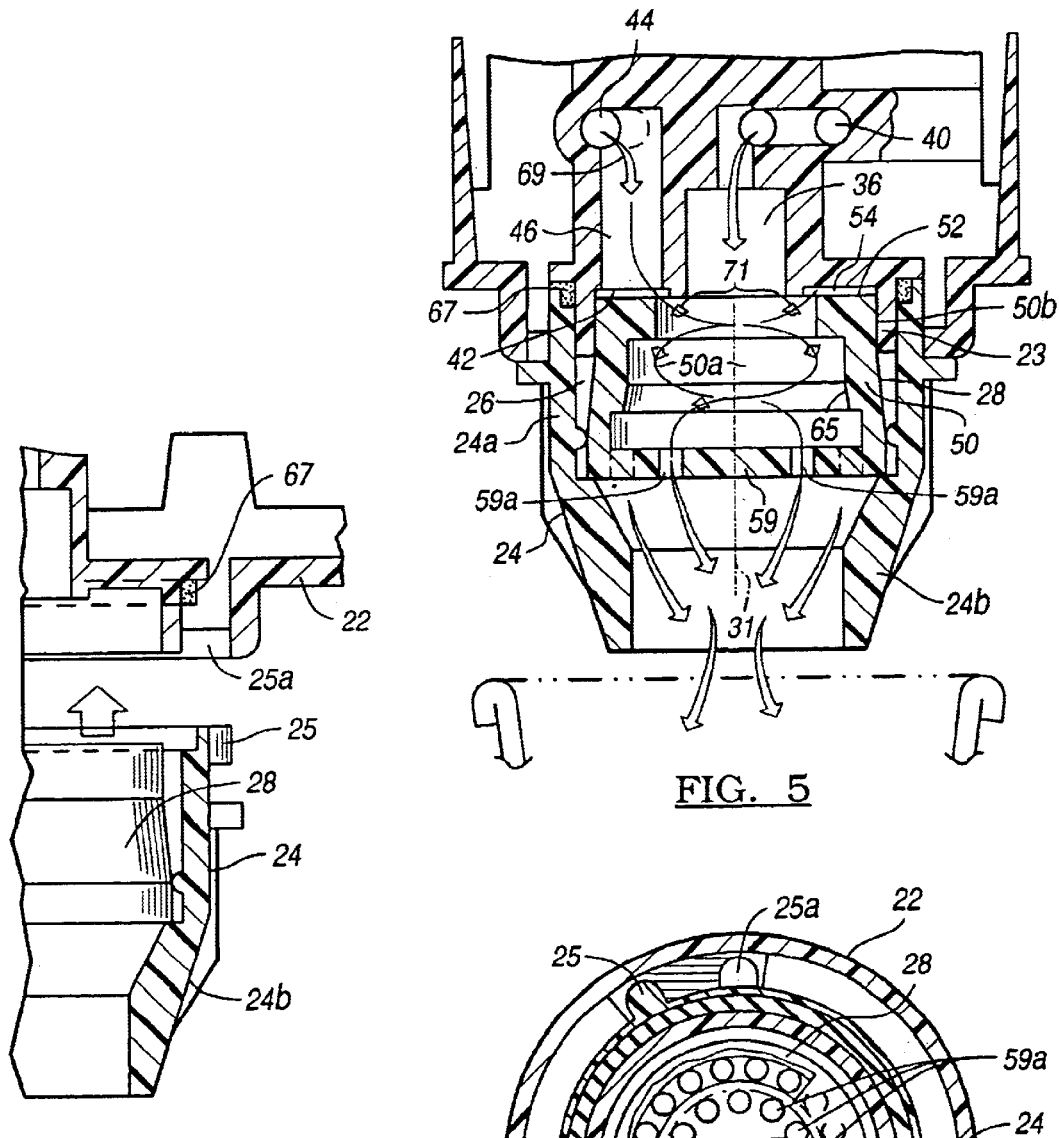
FIG. 4
FIG. 5
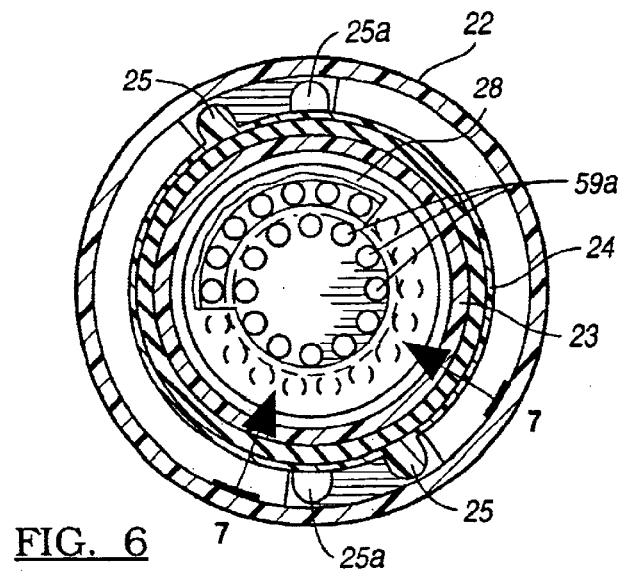
FIG. 6

BEVERAGE DISPENSING APPARATUS INCLUDING A WHIPPER INSERT AND METHOD

BACKGROUND OF THE INVENTION

1. Field of the Invention

The present invention relates generally to a beverage dispensing apparatus. More particularly, the invention concerns a novel apparatus and method for preparing and dispensing whipped beverages.

2. Background Art

Many types of restaurants offer a variety of soft drinks with their meal services. The soft drinks typically comprise a combination of syrup and carbonated or tap water. Certain types of soft drinks are dispensed in a whipped condition. In the past art, the whipping step was typically accomplished using mechanical whipping means such as one or more propeller like blades which are rotated at a relatively high rate of speed to whip the mixture of syrup and water. Exemplary of this type of apparatus is that described in U.S. Pat. No. 4,676,401 issued to Fox et al.

The rotating blade type of whipping apparatus is undesirable for several reasons. In the first place, if the mechanical portions of the apparatus are not continuously cleaned, the apparatus may jam and fail. Additionally, the National Sanitation Foundation (NSF) makes mandatory at least daily cleaning of the prior art whipping apparatus and such cleaning is costly and time consuming. Further, the prior art mechanical mixing devices are typically quite expensive, are somewhat unreliable and generally require continual maintenance. During washing and maintenance, the apparatus is, of course, out of service and cannot be used to accomplish beverage dispensing thus causing costly downtime.

Another prior art beverage whipping apparatus is described in U.S. Pat. No. 6,305,269 issued to the present inventor. That apparatus produces and dispenses whipped soft drinks, such as hot chocolate and like beverages. More particularly, the apparatus efficiently accomplishes the whipping and mixing step by directing a collimated stream of water toward an intersection point within a vented mixing chamber to which a stream of syrup is also directed.

Conventionally, prior art beverage dispensers leave certain problems unsolved. For example, the formation of foam may occur during intermixing. As a result, thorough intermixing of the ingredients may not occur. For example, a whipped drink is generally more viscous than a non-whipped drink. In whipped drinks, restrictions to the flow of syrup tend to impede efficient intermixing with water. Ultimately, complete intermixing may not occur until the syrup and the water are received in the bottom of a cup, often with the undesirable consequence of splashing.

SUMMARY OF THE INVENTION

The thrust of the present invention is to provide a novel whipping insert that will efficiently mix syrup and water and can be conveniently used with many types of commercially available, prior art beverage dispensers. In one form of the invention, the whipping insert is receivable in the mixing chamber of the beverage dispensing apparatus in place of a diffuser which is normally provided with the beverage dispensing apparatus. Conventional diffusers may intermingle the mixture of syrup and water downstream of the insert and the dispensing nozzle in such a way that may cause splashing as the fluids enter a cup.

In contrast with prior approaches, inventive insert causes aeration within the mixing chamber and promotes the efficient intermixing of the ingredients in the mixing chamber before those ingredients escape from the dispensing nozzle. Using one embodiment of the invention, mixing occurs before the fluid escapes through apertures in the floor of the insert.

In using the novel whipping insert of the present invention, the dispensing nozzle of the beverage dispensing apparatus is first removed and then the diffuser is removed from the dispensing nozzle. This done, the whipping insert of the invention is inserted into the mixing chamber of the dispensing nozzle. This step can be accomplished without otherwise modifying the prior art dispensing apparatus and without the use of any special tools. When in place within the mixing chamber, the whipping insert of the invention strategically diverts the water flowing into the mixing chamber in such a manner as to thoroughly intermix the water with the syrup that is flowing into the mixing chamber and, at the same time efficiently whip the syrup-water mixture.

It is an object of the present invention to provide a novel apparatus for producing and dispensing whipped soft drinks, hot chocolate and like beverages which does not use mechanical whipping means such as rotating blades, but rather intermixes the syrup and water and efficiently whips the mixture thus formed through the use of a whipping insert that is receivable within the mixing chamber of the beverage dispensing apparatus.

Another object of the invention is to provide an apparatus of the aforementioned character, in which the whipping insert causes the water flowing into the mixing chamber of the apparatus from the water source to be diverted radially outwardly within the chamber at a relatively high velocity. The water thus diverted will impinge on the stream of syrup that flows into the mixing chamber from the syrup source. As the water impinges on the stream of syrup, it causes a substantial turbulence to occur that efficiently intermixes the syrup and water and at the same time effectively whips the mixture before it is dispensed through the outlet portion of the dispensing nozzle of the beverage dispensing apparatus.

Another object of the invention is to provide a mixing apparatus which requires little maintenance and one which is easy to operate and is highly reliable in continuous use.

Another object of the invention is to provide an apparatus of the character described in the preceding paragraphs, which is of a simple construction and one that can be inexpensively produced and can be used with various types of prior art beverage dispensing devices.

By way of summary, in one embodiment of the invention, the apparatus comprises in combination, a mixing chamber having a syrup inlet and a water inlet through which water flows, at a first velocity; and a whipping insert receivable within the mixing chamber. The whipping insert has a housing with an internal mixing chamber, an outlet, and a shoulder with a portion overlaying a substantial portion of the water inlet to define a restricted water flow path in communication with the internal mixing chamber. In use, the restricted water flow path directs the water radially inwardly of the mixing chamber at a second velocity greater than the first velocity. As the water enters the mixing chamber, it impinges on the stream of syrup entering the mixing chamber, causing a substantial turbulence that intermixes the syrup and water and at the same time effectively whips the mixture before it is dispensed through the dispensing nozzle.

These and other objects of the invention will become apparent from the description, which follows.

BRIEF DESCRIPTION OF THE DRAWINGS

FIG. 4 is a fragmentary, cross-sectional view, similar to FIG. 3, but illustrating in additional detail the interconnection of the dispensing nozzle with the body of the apparatus.

FIG. 5 is a cross-sectional view taken along lines 5—5 of FIG. 3.

FIG. 6 is a cross-sectional view taken along lines 6—6 of FIG. 3.

DETAILED DESCRIPTION OF THE PREFERRED EMBODIMENT(S)

Figure 1:
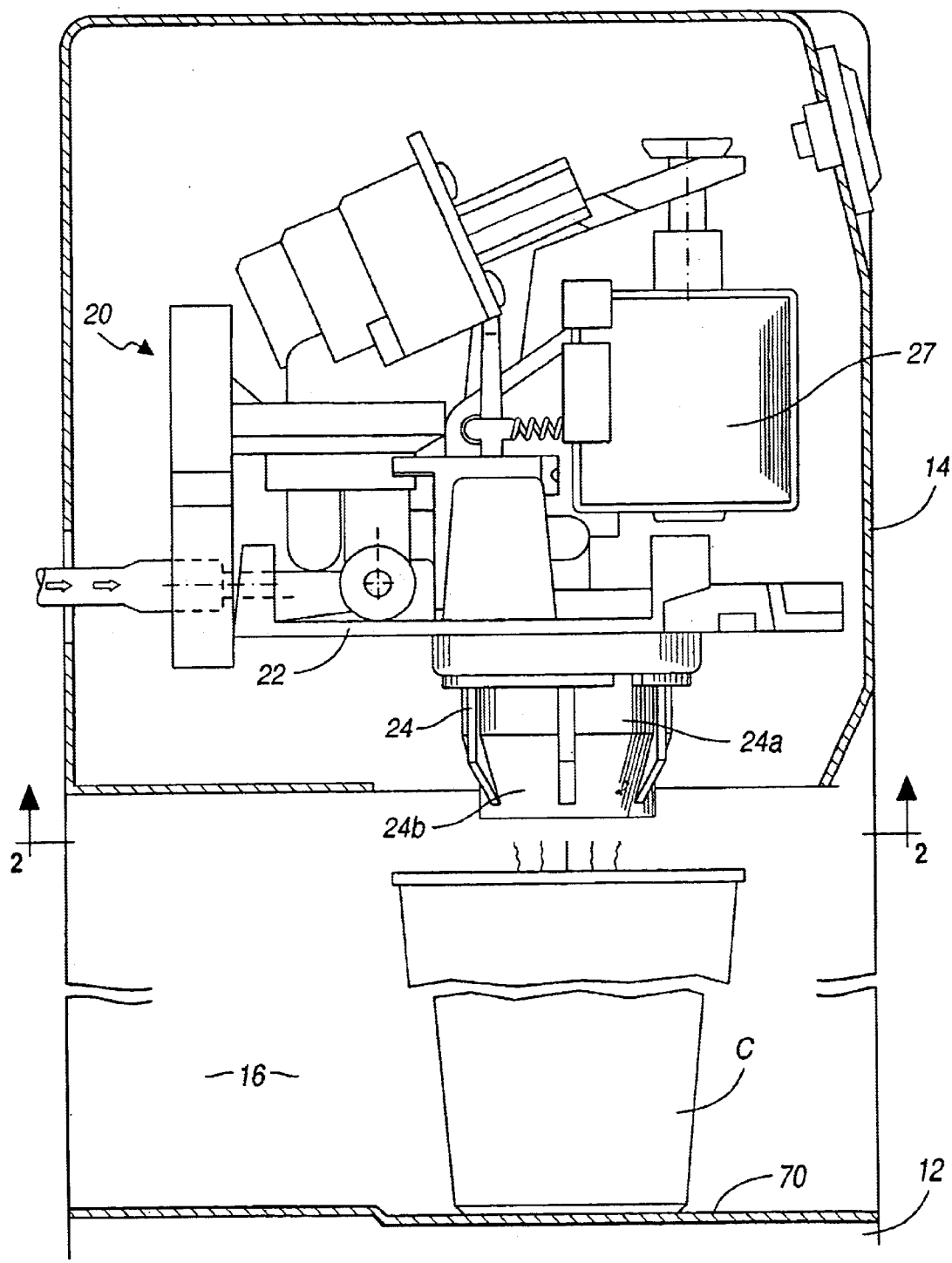
FIG. 1 is a side-elevational view, partly in cross section, of one form of the apparatus of the invention.
Figure 2:
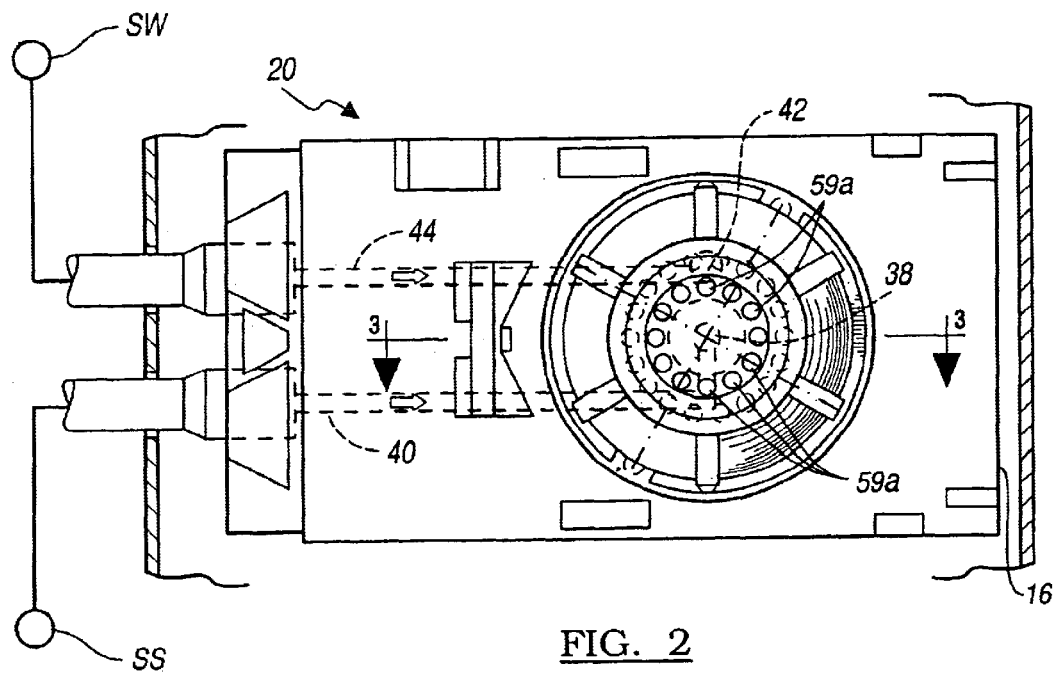
FIG. 2 is a cross-sectional view taken along lines 2—2 of FIG. 1.

Referring to the drawings and particularly to FIGS. 1 through 5, one form of the apparatus of the invention for producing and dispensing a whipped beverage is there shown. This form of the apparatus comprises a base unit 12, a hollow housing 14 located over base 12 and a back panel 16 interconnecting base unit 12 and hollow housing 14. Disposed within hollow housing 14 is a mixing means for mixing the syrup and water to produce the whipped beverage (FIGS. 1 and 2).

Figure 3:
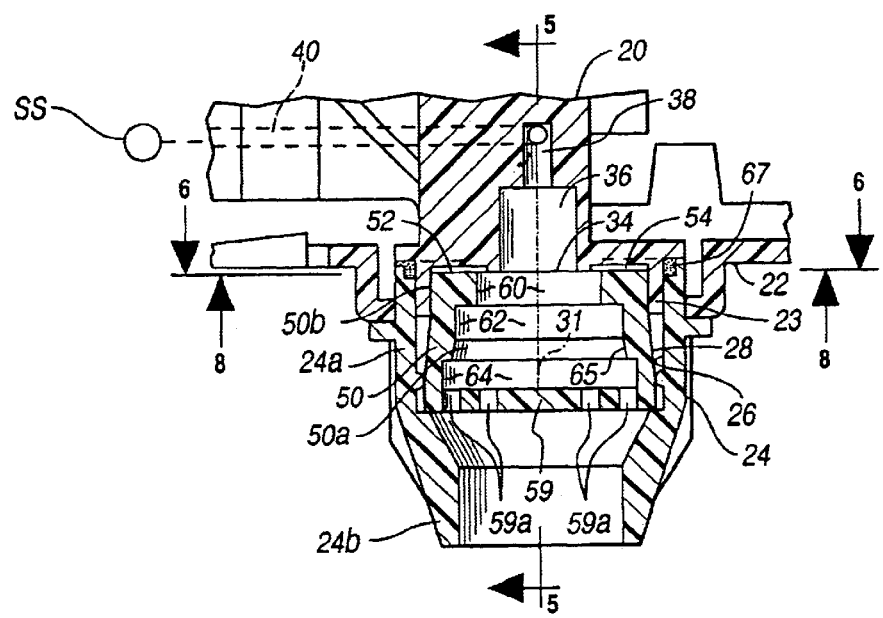
FIG. 3 is a cross-sectional view taken along lines 3—3 of FIG. 2.
Figure 7:
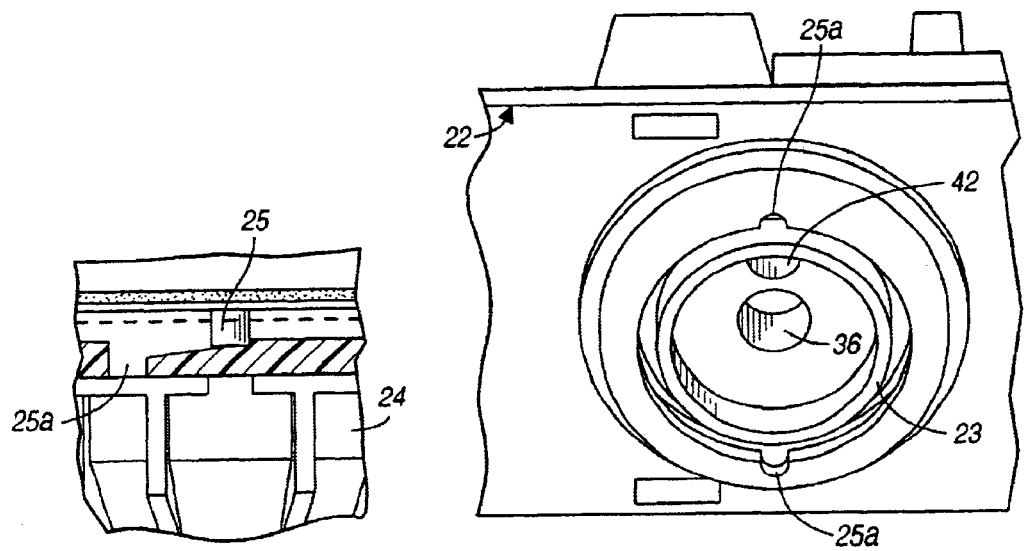
FIG. 7 is a view taken along lines 7—7 of FIG. 6.
Figure 8:
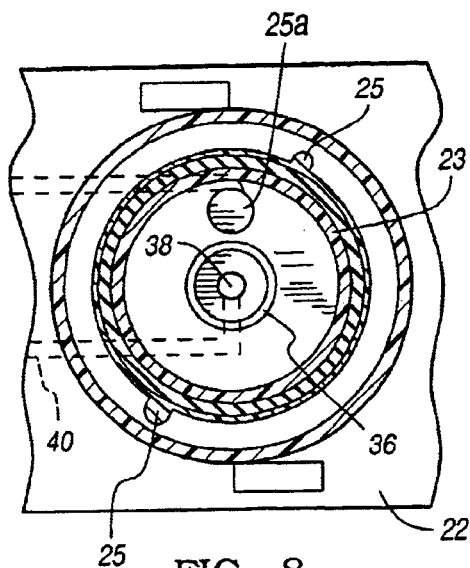
FIG. 8 is a cross-sectional view taken along lines 8—8 of FIG. 3.

Forming a part of the mixing means is a mounting block assembly 20 of generally conventional construction which includes bottom plate 22 and a downwardly extending the flange 23 (FIG. 3). A hollow member 24 having an upper, generally cylindrically shaped portion 24a and a lower, inwardly tapering dispensing nozzle portion 24b is removably connected to bottom plate 22 by a bayonet type locking mechanism that includes circumferentially spaced ears 25 (FIG. 7) that are receivable within openings 25a formed in the bottom plate (FIG. 6). Rotation of member 24 relative to the bottom plate 22 in the manner shown in FIG. 6, will lock the member in position. Formed within upper, generally cylindrically shaped portion 24a of member 24 is a mixing chamber 26 that is of the configuration best seen in FIG. 3. Receivable within mixing chamber 26 is the whipping insert 28 of the invention, the details of construction of which will presently be described.

The dispensing apparatus, or mixing means shown in FIG. 1 is generally similar in construction to several commercially available beverage dispensers, save for the fact that the commercially available dispensers include a diffuser (not shown) that is mounted within the mixing chamber, rather than the whipping insert of the present invention. One source of such a prior art beverage dispenser is available from the Commercial Refrigeration Service, Inc. of Phoenix, Ariz. Without the existence of a whipping insert of the invention, the prior art beverage dispensers do not dispense the uniquely whipped beverages that are dispensed by the apparatus of the present invention.

As is best seen in FIGS. 3 and 5, mixing chamber 26 has an axial centerline 31 that is coaxially aligned with the axial centerline of the whipping insert 28. Mixing chamber 26 also includes a centrally disposed syrup inlet 34 that is also aligned with axial centerline 31. A syrup injection means of conventional construction functions to controllably direct a stream of syrup toward the syrup inlet. Forming a part of the syrup injection means of the invention is source of syrup "SS" that is in communication with syrup inlet 34 via syrup passageways 36, 38 and 40 that are formed within mounting block assembly 20. Mixing chamber 26 is also provided with a radially offset water inlet 42 (FIG. 5). A water injection means of conventional construction functions to controllably direct a stream of water toward the water inlet at a first velocity.

Forming a part of the water injection means is a source of water "SW" that is in communication with water inlet 42 via water passageways 44 and 46 formed in mounting block assembly 22. Forming a part of both the syrup injection means and the water injection means are conventional first and second valve means for controlling the flow of syrup and water from sources "SS" and "WS" toward the mixing chamber 22. These valve means are operated by a solenoid 27 (FIG. 1) and are of a character well understood by those skilled in the art. Such valve means are typically found in the prior art beverage dispensers, including the beverage dispenser offered for sale by Commercial Refrigeration Service, Inc.

Figure 9:
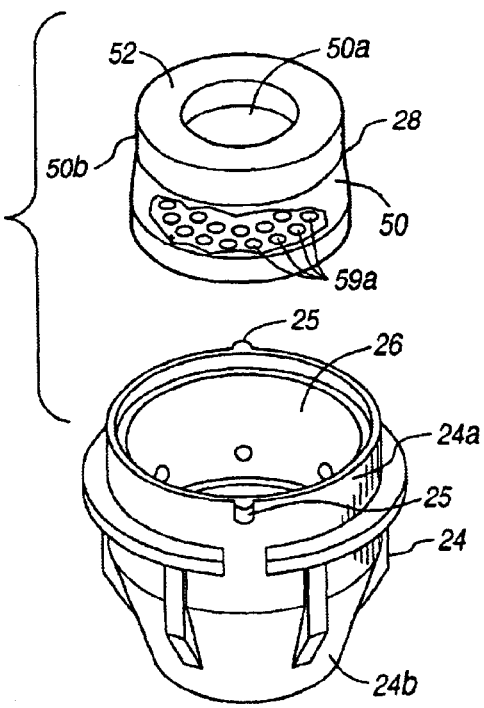
FIG. 9 is a perspective, exploded view of the dispensing nozzle and whipping insert of the apparatus of the invention shown in FIG. 1.

Turning particularly to FIGS. 3, 5 and 9, it can be seen that whipping insert 28 includes an outer wall 50 that defines an internal mixing chamber 50a. As shown in FIG. 5, the upper portion 50b of outer wall 50 is closely received within the downwardly extending flange 23 of the mounting block assembly. Wall 50 terminates in an upper, annular shaped shoulder 52 a portion of which overlays a substantial portion of water inlet 42 (FIGS. 2 and 5). As illustrated in FIG. 5, shoulder 52 cooperates with the mounting block assembly to define an annular shaped restricted water flow path 54. Water flow path 54 communicates with internal mixing chamber 26 in a manner to direct water radially inwardly into the mixing chamber and also into the interior 50b of whipping insert 50 at a second velocity greater than the first velocity at which the water flows into outlet 42 via passageway 46. As the water enters the mixing chamber at this increased velocity, it impinges on the stream of syrup entering the central portion of the mixing chamber via centrally disposed flow passageway 36, causing a substantial turbulence within chamber 50a that efficiently intermixes the syrup and water and at the same time effectively whips the mixture thus formed. In a manner presently to be described, the whipped mixture flows out of the internal mixing chamber of the whipping insert and into the dispensing nozzle portion 24b of member 24 via outlets here comprising a multiplicity of apertures 59a formed in a lower closure wall 59 that is integrally formed with outer wall 50 in a manner to partially close internal mixing chamber 50a.

The internal chamber 50a of the whipping insert, as illustrated in FIG. 3, includes a first portion 60 of a first diameter, a second portion 62 of a second diameter greater than first portion 60 and a third portion 64 of a third diameter greater than second portion 62. As indicated in FIG. 3, a tapered wall portion 65 interconnects the second and third portions 62 and 64 of internal chamber 58.

In an alternate embodiment of the whipping insert, the lower closure wall 59 is lacking. In another embodiment of the invention, the lower closure wall 59 has inwardly radially extending arms that terminate in a generally circular portion that effectively blocks central fluid flow. Instead, fluid flow is urged through an annular area defined between the outer wall and the central region.

Assembly of the apparatus of the present invention can be accomplished by first removing the hollow housing 24 from a selected prior art beverage dispenser by rotating the hollow housing in a manner to align ears 25a with openings 25. With the hollow housing 24 removed, the diffuser supplied with the prior art beverage dispenser can be removed from hollow housing 24 and replaced by the novel upper insert 28 of the present invention. This done, hollow housing 24 can be reconnected with the mounting block using the bayonet fitting in the manner illustrated in the drawings. A conventional O-ring 67 sealably into connects hollow housing 24 with the mounting block.

After the whipper insert is properly positioned within hollow housing 24 in the manner shown in FIG. 3, the flow of water and syrup through the mounting block can be commenced. As the water flows into the mixing chamber via water passageway 46 it will impinge on shoulder 52 of the whipper insert and will be deflected into the annular shaped restricted flow passageway 54. From flow passageway 54, the water will be directed radially outwardly into internal mixing chamber 50a at a higher velocity than that at which it enters the water inlet, in the manner indicated by the arrows 69 in FIG. 5. As the water flows into internal mixing chamber 50a in the direction of the arrows 71 of FIG. 5, it will impinge on and intermix with the syrup flowing into the chamber via central flow passageway 36, causing the desired whipping action.

As indicated in FIG. 1, the nozzle portion 24b of hollow housing 24 is superimposed over a cup-supporting platform 70, which forms a part of base unit 12. Cup supporting platform 70 is adapted to support a receptacle such as beverage cup "C" in the manner shown in FIGS. 1 and 3.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for producing and dispensing a whipped beverage comprising a mixture of syrup and water, the apparatus comprising:
    a mixing chamber having a syrup inlet and a water inlet; and
    a whipping insert receivable within the mixing chamber, the whipping insert having:
    a housing including an outlet; and
    a shoulder located on the housing, the shoulder having a portion blocking at least a portion of the water inlet to define a restricted and accelerated water flow path that passes radially outwardly within the whipping insert and impinges on a stream of the syrup that flows into the whipping insert, so that as the water impinges upon the syrup, it causes turbulence to occur that efficiently intermixes the syrup and the water before they are dispensed through a dispensing nozzle in communication with the internal mixing chamber.

2. The apparatus as defined in claim 1 wherein the housing has an internal mixing chamber with an axial centerline, in which the syrup inlet is substantially aligned with the axial centerline.

3. The apparatus as defined in claim 2 in which the restricted water flow path circumscribes the axial centerline of the internal mixing chamber.

4. The apparatus as defined in claim 3 in which the housing of the whipping insert includes a closure wall partially closing the internal mixing chamber and in which the outlet comprises a plurality of apertures formed in the closure wall.

5. The apparatus as defined in claim 4, further including a dispensing nozzle in communication with the plurality of apertures.

6. An apparatus for producing and dispensing a whipped beverage comprising a mixture of syrup and water, the apparatus comprising in combination, a mixing chamber having a syrup inlet and a water inlet; and a whipping insert receivable within the mixing chamber, the whipping insert comprising a housing having:
    an internal mixing chamber having an outlet;
        a first portion of a first diameter;
        a second portion of a second diameter greater than the said first diameter; and
        a third portion of a third diameter greater than the said second diameter; and
    a shoulder having a portion blocking a portion of the water inlet to define a restricted water flow path in communication with the internal mixing chamber of the whipping insert to direct water into the internal mixing chamber at a higher velocity than the velocity at which the water passes toward the water inlet.

7. The apparatus as defined in claim 6 in which the internal mixing chamber further includes a tapered wall portion interconnecting the second and third portions of the internal mixing chamber.

8. The apparatus as defined in claim 6 in which the internal mixing chamber has an axial centerline and in which the syrup inlet is substantially aligned with the axial centerline.

9. The apparatus as defined in claim 8 in which the restricted water flow path circumscribes the axial centerline of the internal mixing chamber, whereby the water flowing into the internal mixing chamber of the whipping insert via the restricted water flow path impinges on the syrup flowing into the internal mixing chamber.

10. The apparatus as defined in claim 8 in which the housing of the whipping insert includes a closure wall partially closing the internal mixing chamber of the whipping insert and in which the outlet of the internal mixing chamber of the whipping insert comprises a plurality of apertures formed in the closure wall.

11. The apparatus as defined in claim 10, further including a dispensing nozzle in communication with the plurality of apertures formed in the closure wall of the whipping insert.

12. The apparatus as defined in claim 10, wherein the closure wall comprises inwardly radially extending arms that terminate in a generally circular portion that effectively blocks central fluid flow such that fluid flow is urged through an annular area defined between an outer wall of the internal mixing chamber of the whipping insert and the central portion thereof.

13. An apparatus for producing and dispensing a beverage made from a mixture of syrup and water, the apparatus comprising a mixing chamber having an axial centerline, a syrup inlet aligned with the axial centerline; a source of syrup in communication with the syrup inlet; a water inlet offset from the axial centerline; a source of water in communication with the water inlet; syrup injection means for directing a stream of syrup toward the syrup inlet; water injection means for directing a stream of water toward the water inlet at a first velocity; and a whipping insert receivable within the mixing chamber of the apparatus for whipping the beverage, the whipping insert comprising a housing having:

an internal mixing chamber having an outlet and:
  a first portion of a first diameter;
  a second portion of a second diameter greater than the said first diameter;
  a third portion of a third diameter greater than the said second diameter; and
  a tapered wall portion interconnecting the second and third portions of the internal mixing chamber; and
a shoulder having a portion blocking a substantial portion of the water inlet to define a generally annular shaped restricted water flow path in communication with the internal mixing chamber of the whipping insert to direct water into the internal mixing chamber of the whipping insert at a second velocity greater than the first velocity.

14. The apparatus as defined in claim 13 in which the generally annular shaped restricted water flow path circumscribes the axial centerline of the mixing chamber within the whipping insert.

15. The apparatus as defined in claim 13, further including a dispensing nozzle in communication with the plurality of apertures formed in the closure wall of the whipping insert.

16. A method of mixing syrup and water in a beverage dispensing apparatus having a mixing chamber that is supplied with syrup and water, comprising the steps of:

placing a whipping insert within the mixing chamber so that a shoulder portion of the whipping insert blocks a portion of a water inlet and so that the water flow path entering the mixing chamber is restricted;

activating a supply of syrup and water so that they become intermixed by the whipping insert within the mixing chamber of the whipping insert; and dispensing through a dispensing nozzle a mixed, whipped combination of the syrup and the water.

* * * * *